April 22, 1952     G. J. KLOPFENSTEIN     2,593,894
PROPORTIONER RESETTING MECHANISM
Filed Feb. 8, 1947     6 Sheets-Sheet 1

INVENTOR.
GERALD J. KLOPFENSTEIN
BY Edmund W.E. Kamm
ATTORNEY

April 22, 1952

G. J. KLOPFENSTEIN 2,593,894

PROPORTIONER RESETTING MECHANISM

Filed Feb. 8, 1947

INVENTOR.
GERALD J. KLOPFENSTEIN
BY Edmund W.C. Kamm
ATTORNEY

April 22, 1952 G. J. KLOPFENSTEIN 2,593,894
PROPORTIONER RESETTING MECHANISM
Filed Feb. 8, 1947 6 Sheets-Sheet 3

INVENTOR.
GERALD J. KLOPFENSTEIN
BY Edmund W. C. Ramm
ATTORNEY

April 22, 1952 G. J. KLOPFENSTEIN 2,593,894
PROPORTIONER RESETTING MECHANISM
Filed Feb. 8, 1947 6 Sheets-Sheet 5

INVENTOR.
GERALD J. KLOPFENSTEIN
BY Edmund W. C. Kamm
ATTORNEY

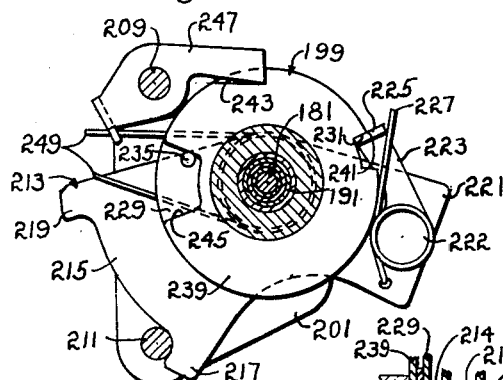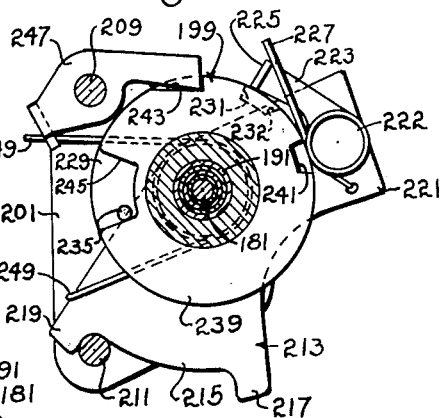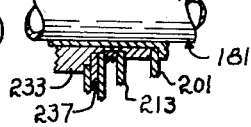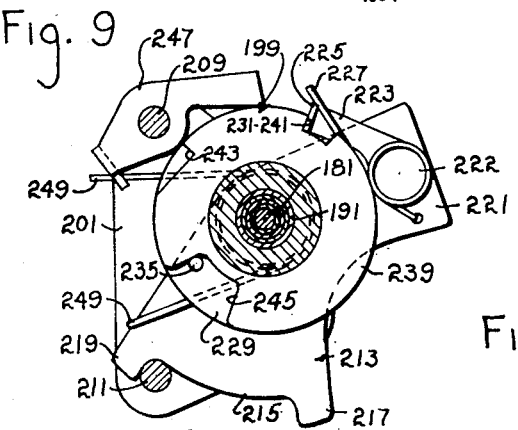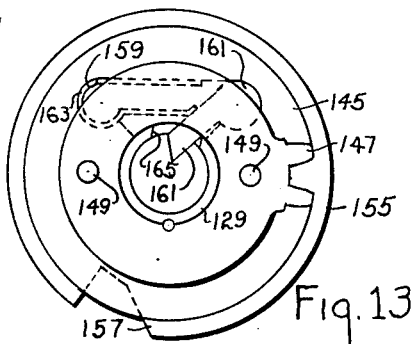

Patented Apr. 22, 1952

2,593,894

UNITED STATES PATENT OFFICE 2,593,894

PROPORTIONER RESETTING MECHANISM

Gerald J. Klopfenstein, Fort Wayne, Ind., assignor to Bowser, Inc., Fort Wayne, Ind., a corporation of Indiana Application February 8, 1947, Serial No. 727,467

10 Claims. (Cl. 222—20)

This invention relates to a liquid proportioner; more specifically, it relates to a proportioner for batch delivery of two or more liquids into a single container.

The device is primarily intended for use in transferring two or more liquids into a drum or other container in measured quantities, with the final quantity of each held to a predetermined liquid volume and with the sum of the quantities equalling the rated capacity of the container.

It is evident that continuous delivery of liquid, for which most proportioners are designed, is not satisfactory where individual containers are to be filled. Therefore, it is necessary that the apparatus measure the desired quantity of each liquid and deliver the aggregate through a common discharge.

An object of this invention is to provide a proportioner comprised of two or more liquid meters receiving liquids from individual conduits and delivering into a common discharge.

Another object of this invention is to provide a liquid proportioner comprised of two or more meters wherein the quantity of liquid passing through each meter is controlled by a predetermined stop mechanism.

It is another object of this invention to provide a liquid proportioner comprised of two or more meters, each having a predetermined stop mechanism for closing a shut-off valve, wherein all of the predetermined stop mechanisms are reconditioned in one operation for the next delivery.

Still another object of this invention is to provide a proportioner to transfer measured quantities of two or more liquids from storage into a common container.

It is still another object of this invention to provide a proportioner to transfer two or more liquids from storage into a common container, each liquid being limited in quantity by its respective meter, and the sum of the quantities passing through all of the meters equalling a predetermined volume.

It is still another object of this invention to provide a liquid proportioner wherein the quantity of each liquid delivered is regulated by a meter and a predetermined stop mechanism, and a series of clutches arranged on a common reset for all the predetermined mechanisms.

It is still another object of this invention to provide a proportioner for repeat quantity deliveries wherein the proportion and the total quantity delivered upon each operation is maintained constant throughout a series of deliveries.

It is yet another object of this invention to provide a liquid proportioner which is adjustable to permit variations in the proportion and in the total quantity of liquid comprising the proportion.

These and other objects will become apparent from a study of this specification and the drawings which are attached hereto and form a part hereof, and in which:

Figure 7 is a sectional view taken substantially on line 7—7 of Figure 11 of the predetermined stop mechanism reset as seen from the left in Figure 4 showing the reset mechanism in the reset position occupied when the indicator dials are preset.

Figure 8 is a view similar to Figure 7 showing the position of the parts when the reset shaft occupies its farthest counterclockwise position preparatory to resetting.

Figure 9 is a view similar to Figures 7 and 8 showing the position of the parts just as the stop pawl has been picked up prior to completion of the resetting of the wheels to their preset positions.

Figure 10 is a section of the predetermined stop mechanism taken on the line 10—10 of Figure 11.

Figure 11 is a section of the predetermined stop mechanism reset taken on the line 11—11 of Figure 16.

Figure 12 is a view of the inferior order indicator dial and cam assembly as viewed from the left in Figure 4.

Figure 13 is a view of a superior order indicator dial and cam assembly as viewed from the left in Figure 4.

Figure 14 is a view of a superior order indicator dial and cam assembly as viewed from the right in Figure 4.

Figure 15 is a section of the superior order indicator dial and cam assembly taken on the line 15—15 of Figure 14.

Figure 16 is an end view of the predetermined stop mechanism reset taken on the line 16—16 of Figure 11.

Figure 1:
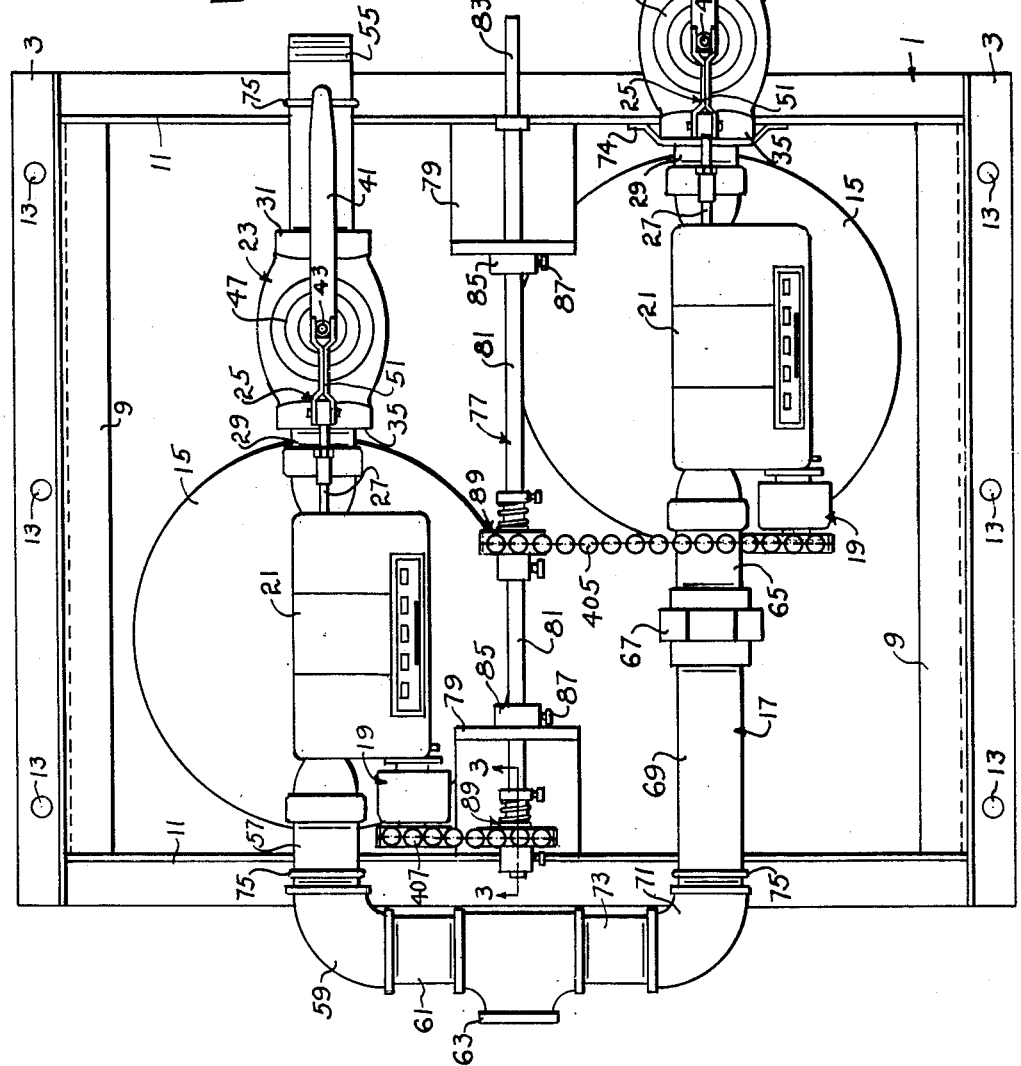
Figure 1 is a plan view of the proportioner showing the general arrangement of the meters, the predetermined stop mechanisms, the registers, and the reset for the predetermined mechanism.
Figure 2:
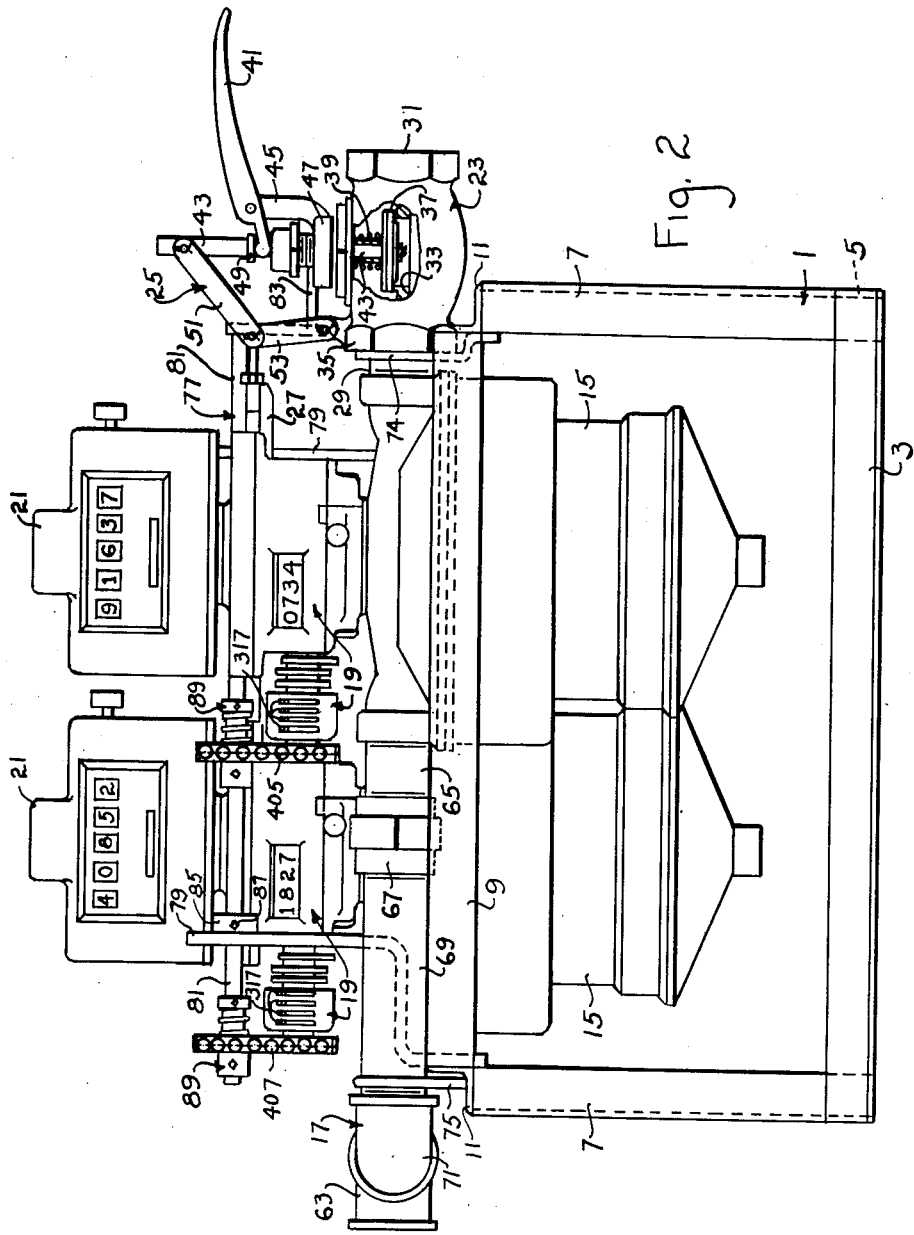
Figure 2 is an elevation of the proportioner as viewed from the front of Figure 1.

Referring to Figures 1 and 2 of the drawings the numeral 1 designates a rectangular frame made of angle irons 3 and 5 in the base, risers 7, and the angles 9 and 11 forming a second rectangle on top of the risers. The angles 3 have holes 13 for bolting the frame to the floor.

Liquid meters 15 are suspended on the frame by the piping 17 (to be described later). Mounted on and driven by each of the meters is a repeat quantity, predetermined stop mechanism 19, hereinafter referred to as a predeterminer, and a register 21.

A shut-off valve 23 is connected by the linkage 25 to the trip bar 27 of the predeterminer and by nipple 29 to the inlet side of the meter. Each valve has an inlet 31 and a port 33 connecting with the outlet 35. A valve poppet 37 is urged into closed position by the spring 39. The lever 41 straddles the shaft 43 and is fulcrumed on an extension 45 of the valve cap 47. A collar 49 on the shaft directly above the lever receives the thrust of the lever when pressed down at the opposite end thereby raising the shaft and the poppet to open the port 33. The linkage 25 is comprised of a pair of arms 51 secured to the shaft 43 and to the trip bar 27 and a second pair of arms 53 secured to the valve body and to the trip bar at the same point as arms 51 thus forming a toggle. As the shaft 43 is raised by lever 41 to open the poppet, the arms 51 and 53 at the same time move the trip bar 27 to the right of the position shown in Figures 1 and 2 where it is latched as will be described below to hold the valve open.

The meters are shown staggered in Figures 1 and 2 to provide visibility of the registers and the staggering necessitates the addition of a nipple 55 on the inlet side of the shut-off valve placed farthest to the left so that the piping will extend over the frame and serve as a support for the meters.

On the outlet side of the left-hand meter in Figures 1 and 2 is a nipple 57, and elbow 59, and another nipple 61 discharging into the T 63, and on the outlet side of the other meter is a nipple 65, a union 67, a nipple 69, an elbow 71, and another nipple 73 discharging into the T 63. Bracket 74 and U bolts 75 hold the assembly against the top of angles 11. The frame angle 11 is notched adjacent the bracket 74 to provide clearance for the valve 23.

The predeterminers have a common reset mechanism 77 for resetting each predeterminer to its preset condition after completion of the delivery. Right-angled brackets 79 extend inward and above the frame angles 11 and provide bearings for the reset shaft 81. A crank 83 is fastened to the right end of the shaft as shown in Figures 1 and 2. Collars 85 are located on the shaft inside the brackets 79 and are secured to the shaft by set screws 87 to prevent lateral movement of the shaft. A pair of friction clutches 89 (shown in detail in Figure 3) are located along the shaft.

The clutches 89 (see Figure 3) are comprised of a driving member 91 secured to the shaft 81 by the set screw 93 and driven member 95, which is made up of a sprocket 97 and a friction facing 99 held together by rivets 101. Said driven member is mounted for free rotation on the shaft. A spring 103, is interposed between the sprocket 97 and a collar 105 fastened to the shaft by set screw 107 so that the spring will keep the facing in engagement with the driving member.

The predeterminer, generally indicated by the numeral 19, is a modification of the predetermined stop mechanism disclosed in the United States Patent No. 2,228,820 issued to C. P. Griffith et al. on January 14, 1941. The predeterminer disclosed herewith differs from the Griffith predetermined stop mechanism in that it provides for the repeated presetting of any quantity set up on the dial, which quantity setting is maintained till such time as the dial indicators are indexed to a different predetermined quantity.

Figure 4:
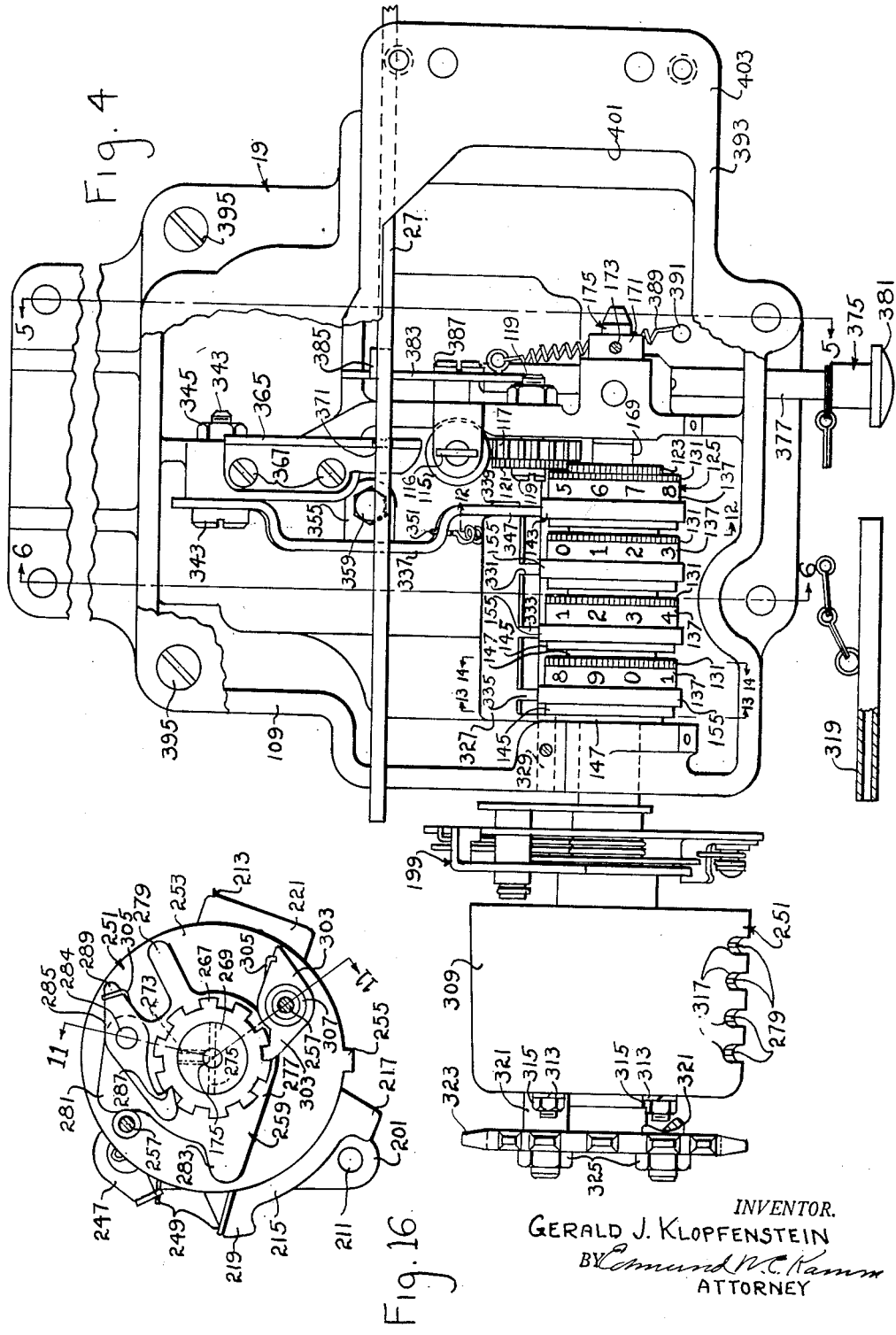
Figure 4 is a view of the predetermined stop mechanism taken from above and with a part of the cover broken away.
Figure 5:
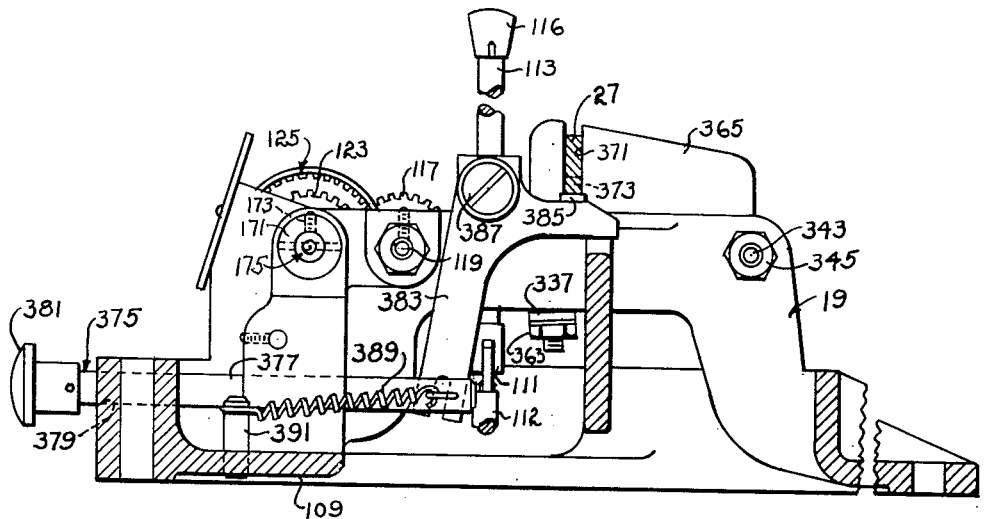
Figure 5 is a sectional view of the predetermined stop mechanism taken on the line 5—5 of Figure 4 showing the manual tripping mechanism.
Figure 6:
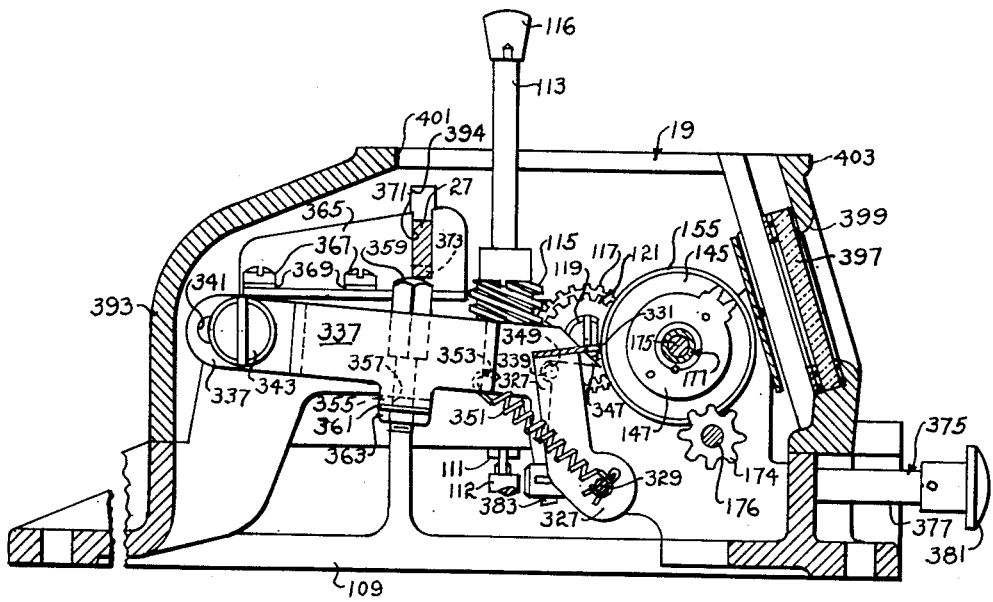
Figure 6 is a sectional view of the predetermined stop mechanism taken on the line 6—6 of Figure 4 showing the automatic tripping mechanism.

Referring to Figures 4, 5 and 6 the numeral 109 designates a frame for the predeterminer which is mounted on the meter by cap screws (not shown).

A slotted coupling 111 engages the register drive shaft 112 of the meter and rotation is transferred thereby to shaft 113 and worm 115. The shaft 113 extends through the worm and the upper end 116 is flattened to engage a coupling similar to coupling 111 on register 21. The worm wheel 117 is mounted for rotation on the stud 119, which is in turn carried by the frame 109. A spur gear 121 is fixed to the worm wheel and drives another spur gear 123 which is a part of the first or inferior dial indicator assembly 125.

The first and the second dial indicator assemblies use the same size hubs 129, shown in Figure 12, while the hubs in the third, also designated by the numeral 129 (Figure 13), and the fourth (not shown) are successively larger. The purpose of this will be explained later. In other respects the dial indicators are identical with the exception that the cam of the first assembly is notched differently and the gear 131 carries the gear 123 which is not on the other assemblies.

Referring to Figures 12, 13, 14 and 15, the first indicator dial assembly is comprised of a spur gear 131 pinned to the gear 123. The gear 131 carries a pair of pivotally mounted pawls 133 which are urged toward the periphery of the gear by springs 135. The gear slides over the end of the hub 129 stopping against a shoulder thereon and against the radial face of the indicator dial 137. The dial has a cylindrical recess 139 to receive the ratchet 141. A cam 143, a transfer pinion locking disc 145, and a step-tooth gear 147 are assembled on the hub beyond the dial and are held together as a unit with the dial indicator by pins 149. The cam 143 of the first dial indicator is notched as shown at 151 (Figure 12) and a sector of the periphery cut away as shown at 153. The cams 155 for the second, third and fourth dial indicators are notched as shown at 157 (Figure 13). It will be noted that the radial edge of each notch 157 is on one side while the radial edge of notch 151 in the first wheel is on the opposite side of the notch 151. The reason for this difference will become apparent in the description of operation. The transfer pinion locking disc 145 (Figs. 12, 13 and 15) has a cut-out portion 159 in which is nested the set-back pawl 161 and the spring 163 which urges the pawl toward the center of the hub through a slot 165 extending in from the end of the hub.

The dials are arranged in the order named from right to left in Figure 4 on the shafts 175, 177, 179 and 181. A spacer 169 is inserted between the first dial indicator and the bearing in the frame. A collar 171 and set screw 173 on the other side of the frame bearing hold the shaft from movement to the left.

The step-tooth gear 147 of each the first, second and third dial indicators is adapted to drive a transfer pinion 174 (Figure 6) which is rotatably mounted on a shaft 176 fixed in the frame 109. The pinion is in turn in mesh with gear 131 of the dial assembly immediately to the left of the driving dial as viewed in Figure 4.

The presetting mechanism 167 (Fig. 11) is comprised of four telescopic shafts designated by the numerals 175, 177, 179 and 181 respectively from right to left in the figure. Each shaft has a respective keyway designated 183, 185, 187 or 189 spaced to engage the reset pawls 161 in the first, second, third and fourth indicator dials respectively when they are mounted as shown in Figure 4. The shaft 181 extends through a bushing 191 having a shoulder 193 with one end 195 of the bushing fitted into a hole 197 in the frame 109 with the shoulder butting against the outside of the frame.

The reset stop mechanism designated generally by the numeral 199 (see Figs. 7 to 11, inclusive) is mounted on the bushing 191 on the side of shoulder 193 opposite the frame 109 with the support plate 201 held in a position parallel to the frame by a spacer 203 and a screw 205, the latter engaging the threaded hole 207 in the frame. The support plate carries the outwardly projecting lock pawl post 209 and the zero stop post 211 (Figs. 7 to 9). The reset plate 213 is mounted on a shouldered hub 212 (see Fig. 10), which slides over the bushing 191. The hub extends through the plate and is swedged over on the end after a collar 214 has been slipped over it and against the reset plate 213. The reset plate has a radial portion 215 which terminates in projections 217 and 219 which, with post 211, limit the rotation of the reset plate. A leg portion 221 of the reset plate 213 has a post 222 which carries a pawl 223 having an ear 225 bent up at right angles at its free end. The spring 227 urges the pawl in a counterclockwise direction.

The circular, reset operating disc 229 (Figs. 7 to 10) has a single peripheral notch 231 provided with a cam edge 232, and is swedged fast to the smaller of two shoulders on the hub 233 (Fig. 10). A pin 235 projects from the hub side of the disc. A spacer 237 is also mounted on the smaller shoulder and is adjacent the locking disc 239 which is mounted for free rotation upon the larger shoulder. The locking disc is circular in shape and has three peripheral notches 241, 243 and 245, as shown in Figures 7, 8 and 9, notch 241 being identical in shape to notch 231 in the reset operating disc. Pin 235 extends through the notched portion 245 in disc 239 to limit the rotation of the locking disc in relation to the reset operating disc.

The projection 225 on the pawl 223 engages the notches 231 and 241 in the reset operating disc and the locking disc when they are in alignment.

A pawl 247 is pivotally mounted on the post 209 and is urged by a torsion spring 249 in a clockwise direction (Figs. 7 to 9) to engage the notch 243 of the locking disc when it moves into position. The other end of the spring 249 is hooked over the reset plate 213 to urge it in a counterclockwise direction with projection 219 against the stop post 211.

The indexing and reset mechanism 251 (Fig. 11) has a circular driving disc 253 staked to the hub 233. A projection 255 (Fig. 16) extends out from the periphery of the disc and diametrically opposed studs 257 are riveted to the outside face of the driving disc.

The indexing mechanism is comprised of four assemblies numbered from left to right in Figure 11 as follows: first dial indicator indexing assembly 259, second dial indicator indexing assembly 261, third dial indicator indexing assembly 263, and fourth dial indicator indexing assembly 265. It will be noted that the dial indicators are numbered from right to left and the indexing assemblies from left to right because the lefthand indexing assembly controls the right-hand dial assembly. The indexing assemblies differ only in the size of the central hole, which must match the size of the telescopic shaft which it is intended to actuate and in the method of mounting the first indexing assembly.

The first indexing assembly 259 has a tentooth ratchet 267 (Figs. 11 and 16) with integral hubs 269 and 271 extending out on opposite sides. A set screw 273 is threaded into the hub 269 and engages the shaft 175 for locating purposes, after which pin 275 is inserted into a hole drilled through the hub and the shaft to hold the parts against relative rotation.

An indexing means is comprised of the indexing plate 277, having a finger-like projection 270 and two abutments or stops 281 and 283 which span one of the studs 257 to limit the travel of the indexing arm assembly and the stud 284 for pivotally mounting the indexing pawl 285 which has a hooked end 287 to engage the teeth of the ratchet 267 and a tail 289 which is engaged by spring 305 for holding the pawl against the ratchet. The indexing plate is mounted on a hub 291 which rides on the hub 271 of the ratchet 267.

The second, third and fourth indexing assemblies, numbered 261, 263 and 265 respectively comprise parts identical with the parts just described except that the ten-tooth ratchets 293, 295 and 297 each have a central hole of a diameter to receive the mating shaft.

The reset ratchet 293 has a bore 295 to fit the telescopic shaft 177 and a keyway 298 into which the shaft 177 is swedged as shown at 299. The ratchets 295 and 297 are attached to the shafts 179 and 181, respectively, in the same manner.

Spacers 301 and holding pawls 303 are alternately arranged along one of the studs 257 outward from the driving disc 253 to align the holding pawls with the ratchets 267, 293, 295 and 297. Torsion springs 305 which urge the indexing pawls 285 in a counterclockwise direction also urge the holding pawls 303 in a clockwise direction as viewed in Figure 16. Another spacer 307 is mounted beyond the holding pawl for the first dial indicator indexing means and a cup-shaped case 309 which extends back over the driving disc is mounted on the studs 257. There are two holes 311 in the closed end of the cup allowing it to pass over the reduced threaded ends of the studs 257. Lock washers 313 and nuts 315 complete the assembly. The cup also has four elongated slots 317 along one side, one in alignment with each lever 279 to permit insertion of the indexing lever 319, which is chained to the predeterminer to prevent loss. The lever receives the lever 279 and may be oscillated to reset the associated indicator.

Two additional shouldered and threaded studs 321 are riveted into the end of the cup 309 (Fig. 4) and a sprocket 323 is held in concentric relation to the cup by nuts 325.

A bail 327 (Figs. 4 and 6) is pivotally mounted for rocking motion on the shaft 329 which is supported in the frame 109. The bail has three projections 331, 333 and 335 which respectively engage the second, third and fourth cams 155.

A lever 337 is disposed adjacent the end of the bail in alignment with the cam 143 and rests upon and against a rivet 339 which is fixed in the bail. The lever has a slot 341 at the opposite end. A pivot screw 343 is passed through the slot and is supported in a hole in a portion of the frame 109. A nut 345 engages the threads of screw 343 on the opposite side of the base portion. The lever is offset, as shown in Figure 4, and is provided with a projection 347 which lies in the plane of the cam 143 and is adapted under certain conditions to enter the notch 151 thereof. The lever is also provided with a recess 349 which is adapted to be received between the upright arm of bail 327 and the head of rivet 339.

A spring 351 (Fig. 6) is hooked over the shaft 329 and through a hole 353 in the lever 337 urging the lever and bail 327 in a clockwise direction and the projections 331, 333 and 335 on the bail and projection 347 on the lever into contact with the cams 155 and 143 respectively. An ear 355 is bent at right angles to the main portion of the lever on the bottom side and has a tapped hole 357 which receives the adjustable trip stud 359. The lock washer 361 and the jam nut 363 hold the trip stud in its adjusted position.

A right-angled latch plate 365 has one leg secured to the base 109 by screws 367 and washers 369 and has the other leg extending upward. A notch 371 extends down from the top of this leg and the lower wall defining the notch engages a notch 373 in the trip bar 27 when the valve 23 is open.

An emergency trip mechanism (Fig. 5) is designated generally by the numeral 375 and is comprised of a shaft 377 slidably mounted in a hole 379 in the frame and having a knob 381 pinned to the outside end and a bell crank 383 pivotally mounted on a shoulder screw 387 which enters the frame, said crank having one leg fastened to the other end of the shaft and the other leg having a bent-over ear 385 in position to lift the trip bar 27. Spring 389 has one end anchored to the lower end of the bell crank and the other end to a stud 391 having a knurled end pressed into a hole in the frame. The spring exerts a clockwise force on the bell crank, as viewed in Figure 5, which tends to keep the bell crank from dislodging the trip bar 27 from its latched position.

A cover 393 is placed on top of the frame 109 and held by screws 395. The cover has a pair of elongated holes 394 one of which is shown in Figure 6, through which the ends of the trip bar 27 extend and which serve as guides for the trip bar. The holes are high enough to permit lifting the bar to disengage the notches. A glass 397 is placed in a window 399 directly in front of the dial indicators. The cover also has an opening 401 at the top through which the shaft 113 extends. The opening is surrounded by a flange 403 for mounting a register, such as indicated by the numeral 21.

Chains 405 and 407 are placed over the sprockets 97 on the clutches 89 and the sprockets 323 on the predeterminers. Chain 407, due to positioning of the meters, is shorter than chain 405.

Operation

The proportioner shown in Figures 1 and 2 is piped to two liquid sources. Each liquid enters through a valve 23 and is metered individually, after which they converge into a common discharge through the T 63.

Each predeterminer is set for the desired quantity of liquid that is to pass through the respective meter. This is accomplished by inserting the indexing lever 319 through the slot 317 farthest to the left in the cup 309, as shown in Figure 4, and over the finger 279. A downward stroke of the lever will ratchet the first dial indicator around $\frac{1}{10}$ of a revolution. The motion is transmitted through the indexing assembly 259 with pawl 285 moving the ratchet 267 and the shaft 175 clockwise, as viewed in Figure 16. Holding pawl 303 will be cammed in a counterclockwise direction and will engage the next notch when it comes into alignment. The keyway 183 at the other end of the shaft 175 will rotate with the shaft and engage the pawl 161 in the first dial indicator 125 and move the dial indicator 155 $\frac{1}{10}$ of one revolution per stroke of the indexing lever. The pawls 133 will slip on the ratchet 141. The strokes are repeated until such time as the desired number on dial 155 appears in the cover window. This first indicator may be graduated in tenths of a gallon, as shown, or in gallons with changes in the gearing.

The second, third and fourth dial indicators are set in the same manner by moving the other levers 279 and the quantity shown in the predeterminer window will be the predetermined quantity which will be delivered by its respective meter.

The valves 23 are now opened either singly or together, by depressing the levers 41 which will straighten the linkage 25 and will pull the trip bar 27 to the right. The notch 373 in each trip bar will engage the notch 371 in the corresponding latch plate 365 to hold the associated valve open.

The first dial indicators are now operated by the meters in a clockwise direction as viewed in Figure 6 by shaft 111, worm 115, worm wheel 117, gears 121—123. For each revolution of the first indicator, the step-tooth gear 147 and transfer pinion 174 advances the second indicator $\frac{1}{10}$ of a revolution and so on. The notches 151 and 157 in the cams 143 and 155 are positioned to allow the bail 327 to rock forward under the action of spring 351 and the lever 337 to move up and forward when the zeros on the indicators are in alignment with the cover window. In operation the dial indicators return to the zero position from left to right as viewed in Figure 4. The spring 351 urges projections 331, 333, 335 on bail 327 into engagement with the periphery of the cams 155 while the nose 347 is held away from cam 143 by the pin 339. When all of the notches in cams 155 are in alignment with the bail, the bail will rotate clockwise (Fig. 6) and bring the nose 347 of lever 337 against cam 143 and when the cam notch 151 thereof aligns with nose 347, the lever will be moved forward by spring 351 and will enter the notch.

The edge of notch 151 will lift the lever and this will in turn lift trip stud 359 to raise the trip bar 27 so as to disengage the notches 371—373. The spring 39 in the valve 23 will close the valve and move the trip lever 27 to the left (Fig. 2). Closing of the valves will take place separately as each preset quantity is delivered and as each meter is stopped by the associated valve when the indicators read zero, it will be necessary to again preset the indicators before proceeding with a further delivery.

The predeterminer is reset for repeat delivery by rotating the crank 83 and mechanism 77 which in turn rotates clutch mechanisms 89 and the respective shafts 175, 177, 179 and 181 through pawls 303 and ratchets 267. The shaft 181 of this group cannot be rotated in a clockwise direction, as viewed from the left in Figures 4 and 11, because the projection 225 of pawl 223 (Figs. 7, 8 and 9) occupies both of the notches 231 and 241 on discs 229 and 239 and stop 217 engages 211 and therefore prevents the rotation of all of the shafts. Accordingly, it is necessary to operate the cup 251, disc 253, hub 233 and disc 229 in a counterclockwise direction, whereupon the cam edge 232 of notch 231 will cam projection 225 out of the notches and disc 229 will come to the position shown in Figure 8 where it is stopped by pin 235 hitting the lower edge of notch 245. Disc 231 is held against rotation by pawl 247. When projection 225 is cammed out of the notches, spring 249 will rotate plate 213 in a counterclockwise direction until projection 219 contacts the post 211. In other words, the parts move from the positions of Figure 7 to those of Figure 8.

Since disc 229 is now free from pawl 223, the projection 225 of which now rides on the circular outline of disc 239, clockwise motion of disc 229 is now permitted.

Upon rotating cup 309 in the clockwise direction, pawls 303 drive ratchets 267, shafts 175, 177, 179 and 181 and the keyways 183, 185, 187 and 189 so that the latter will pick up the pawls 161 of the various indicator dials 125 and 137 and all of the indicator dials will be advanced until the numeral representing the predetermined quantity appears in the window 399. The keyways, of course, occupy the various positions to which they were preset by the lever 319.

During such rotation of the shafts, the pin 235 on disc 229 will contact the upper edge of notch 245 and the two discs 229 and 239 will rotate together in a clockwise direction. The notches 231 and 241 of the discs will be in alignment because of the relation of pin 235 to the notch 245 and as the cup rotates, the notches will arrive at the position shown in Figure 9 where spring 227 will force the projection 225 of pawl 223 into the aligned notches.

The rotation of the discs in this direction is continued, the lever 221 being carried along, and will be limited by the contact of projection 217 with post 211. At this point, which is exactly one revolution from the original, Figure 7 position, the preselected numeral for each of the indicator dials will have been aligned with and positioned in front of the window 399. Also, when the parts reach this position, pawl 247 will engage notch 243 to hold disc 239 against rotation in a counterclockwise direction under the influence of lever 221 and spring 249 (Figs. 8 and 9).

It will be seen that further motion of the shafts 175, 181 in this direction is definitely limited because they are all locked together through cup 309 which is directly connected with disc 229 and because motion of the disc 229 in a clockwise direction is definitely limited through pawl 223 and plate 213 which carries the projection 217.

It will be seen that by reason of counterclockwise rotation of the shaft 167 at the outset of the resetting operation, the keyways 183, 185, 187 and 189 have been rotated through more than one revolution by the amount of the initial counterclockwise motion, thus insuring that all of the pawls 161 will be picked up in the resetting operation. This has the advantage that two complete revolutions of shaft 167 are avoided.

Figure 3:
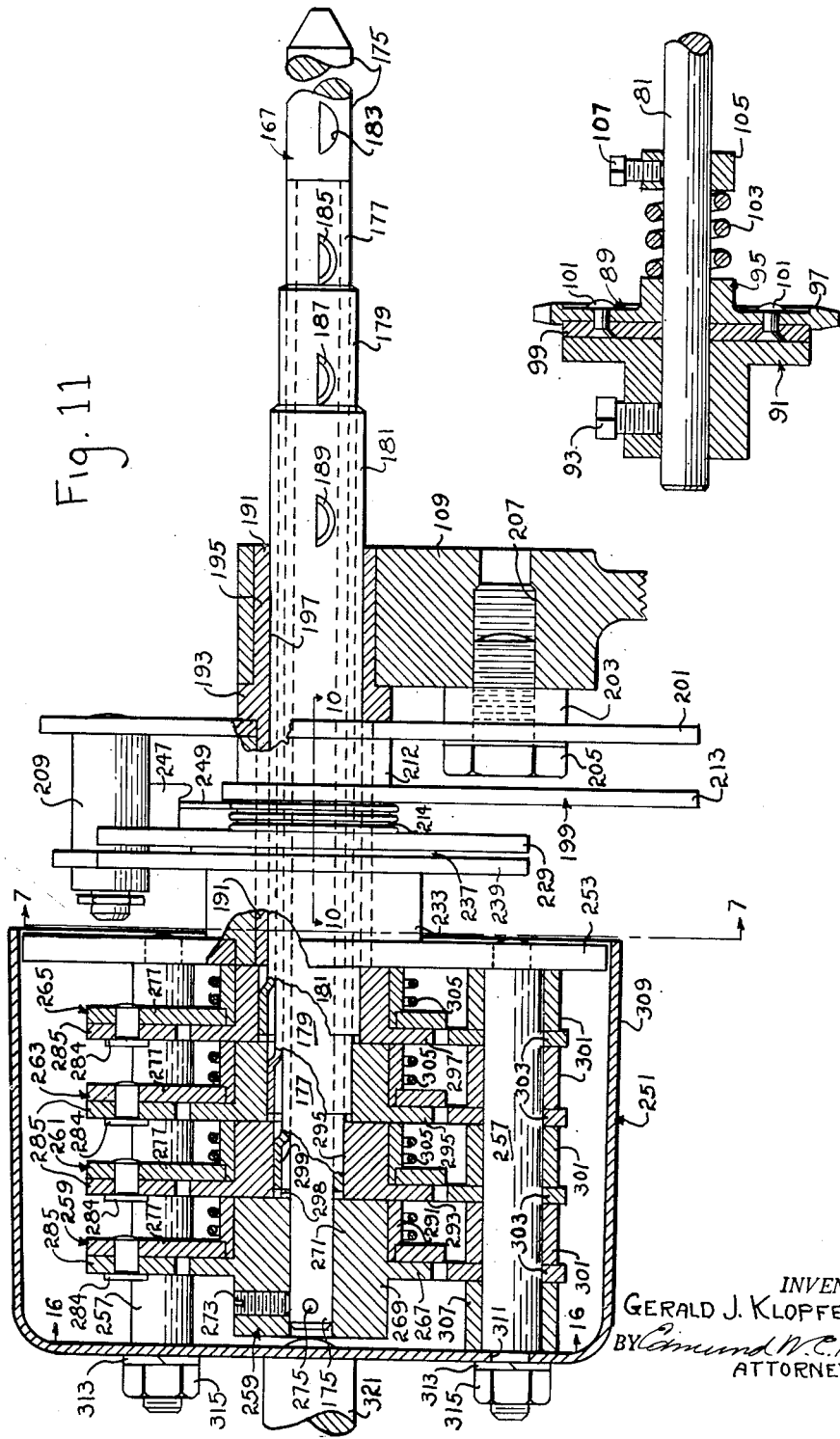
Figure 3 is a sectional view of one of the reset clutches taken on the line 3—3 of Figure 1.

The sprockets 323 which are fixed to the cups 309 are connected by the chains 405, 407 with sprockets 97, which are a part of the clutches 89, shown in detail in Figure 3. The clutches are responsive to rotation of the shaft 81 in either direction, which is actuated by the crank 83. When it is desired to reset the predeterminers, the crank 83 is rotated in a clockwise direction, as viewed from the right in Figures 1 and 2, until the reset stop mechanisms 199 assume the positions shown in Figure 8. The clutches 89 will slip if it is attempted to turn the crank beyond this position and will thus protect the predeterminer mechanisms against breakage. The crank is then turned in a counterclockwise direction until the reset stop mechanisms halt further motion. This occurs when the position shown in Figure 9 is reached by all of the stop mechanisms. The clutches again protect the predeterminer mechanisms against damage from excess rotation of the crank. The predeterminers are now reset for the succeeding delivery and it is necessary merely to reopen both valves.

The emergency trip 375 may be pressed inwardly in case it is necessary to stop the delivery for any urgent reason, to lift the trip bar 27 out of its latched position and close the valve 23. After using the emergency trip, the predetermined delivery may be completed by opening the valves 23 and completing the delivery. The liquids delivered will be in the required proportion. A new delivery may be instituted by resetting the predeterminer before opening the valves but in this case there will be no assurance that the quantities dispensed prior to the operation of the trip are in the required proportion.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate its control means to stop the flow, means for presetting each of said mechanisms to initial position for a predetermined delivery, and means for resetting said mechanisms simultaneously to their initial positions.

2. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means, means for presetting each of said mechanisms to initial position for a predetermined delivery, means driven by each meter for moving said mechanism to actuate the control means to stopping position, a single manual operator and mechanical means actuated by said operator for resetting said mechanisms simultaneously to their initial positions.

3. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means to stop the meter, means for presetting each of said mechanisms to initial position for a predetermined delivery, means for resetting said mechanisms simultaneously to their initial positions after a delivery, comprising a single, manually operable element, and mechanical means connecting said element to drive said resetting means, said connecting means comprising a yieldable drive connection with each of said resetting means.

4. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means to stop the meter, means for presetting each of said mechanisms to initial position for a predetermined delivery, and means for resetting said mechanisms simultaneously to their initial positions after a delivery, comprising a single operator and mechanical means connecting said operator to actuate all of said resetting means, said mechanical means comprising an overload clutch connected with each resetting means.

5. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means to stop the meter, means for presetting each of said mechanisms to initial position for a predetermined delivery, resetting means rotatable in one direction for resetting said mechanisms simultaneously to their initial positions after a delivery, means for rotating the resetting means and means for preventing rotation of said resetting means in resetting direction until they have been first rotated in the opposite direction.

6. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means to stop the meter, means for presetting each of said mechanisms to initial position for a predetermined delivery, resetting means rotatable in one direction for resetting said mechanisms simultaneously to their initial positions after a delivery, means for rotating the resetting means and means for preventing rotation of said resetting means in resetting direction until they have been first rotated in the opposite direction, said resetting means comprising an overload clutch which means yield in either direction of rotation.

7. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means to stop the meter, means for presetting each of said mechanisms to initial position for a predetermined delivery, means for resetting said mechanisms simultanously to their initial positions after a delivery, said resetting means comprising an overload clutch connected with each resetting means, and means common to all of said clutches for driving them.

8. In a predetermined stop mechanism, the combination of a plurality of stop elements mounted for movement between preset and stop positions, means for individually presetting said elements, comprising individual ratchet means for each stop element and a setting pawl for each ratchet means, means for driving said elements to stop position, means for thereafter resetting said elements simultaneously to preset positions, said resetting means comprising a member rotatable in a resetting direction and resetting pawl means in engagement with each ratchet means and fixed to said member to be simultaneously rotatable therewith.

9. In a predetermined stop mechanism, the combination of a plurality of stop elements mounted for movement between preset and stop positions, a shaft for each element, said shafts being telescoped, means for individually presetting each element by rotating its shaft, said presetting means comprising individual ratchet means for each stop element and a setting pawl for each ratchet means, means for thereafter locking said ratchet means together, means for driving said elements to stop position and means for thereafter resetting said elements by simultaneously rotating said locking means in a resetting direction to preset position.

10. In a proportioning apparatus the combination of a number of dispensing flow lines, a meter in each line, means for commingling the fluids delivered from said meters, control means in each line for starting and stopping the flow, a resettable predetermined stop mechanism driven by each meter and connected to actuate the control means to stop the meter, each mechanism comprising a plurality of stop elements, means comprising presettable telescoped shafts, one for each element for individually presetting said elements, means connecting the corresponding meter for driving said elements to stop position, means rotatable in one direction for restoring said shafts and elements simultaneously to their preset positions, and means for preventing rotation of said restoring means in resetting direction until it has been first rotated in the opposite direction, said restoring means comprising overload clutch means which yield in either direction of rotation.

GERALD J. KLOPFENSTEIN.

REFERENCES CITED

The following references are of record in the file of this patent:

UNITED STATES PATENTS

| Number | Name | Date |
|---|---|---|
| 1,349,256 | Bechtold | Aug. 10, 1920 |
| 1,744,307 | Gluck | Jan. 21, 1930 |
| 1,823,960 | Troutman | Sept. 22, 1931 |
| 1,876,512 | Pfening et al. | Sept. 6, 1932 |
| 1,964,028 | Boynton et al. | June 26, 1934 |
| 1,985,918 | De Lancy | Jan. 1, 1935 |
| 2,051,597 | Head | Aug. 18, 1936 |
| 2,082,391 | Granberg | June 1, 1937 |
| 2,116,785 | Griffith | May 10, 1938 |
| 2,137,013 | Bradley | Nov. 15, 1938 |
| 2,196,805 | Berck | Apr. 9, 1940 |
| 2,340,743 | Griffith | Feb. 1, 1944 |